United States Patent
Mitsuda et al.

[11] Patent Number: 6,019,299
[45] Date of Patent: *Feb. 1, 2000

[54] CEMENT CLINKER GRINDING APPARATUS USING VERTICAL ROLLER MILL AND ITS METHOD

[75] Inventors: Yoshihiro Mitsuda, Kakogawa; Seisuke Sawamura, Akashi; Hiroshi Ueda; Fuminori Ando, both of Kobe; Kanzaburo Sutoh, Tsukumi; Mitsuaki Murata, Kumagaya; Akihiko Takayama, Tsukumi, all of Japan

[73] Assignees: Kawasaki Jukogyo Kabushiki Kaisha, Kobe; Taiheiyo Cement Corp., Tokyo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/832,973

[22] Filed: Apr. 4, 1997

[30] Foreign Application Priority Data

Apr. 18, 1996 [JP] Japan .................................. 8-096774

[51] Int. Cl.[7] .................................................. B02C 15/00
[52] U.S. Cl. ............................... 241/24.1; 241/29; 241/80
[58] Field of Search ......................... 241/24.1, 29, 152.2, 241/80, 97, 79.1

[56] References Cited

U.S. PATENT DOCUMENTS 5,221,051  6/1993  Hashimoto et al. .................. 241/152.2

FOREIGN PATENT DOCUMENTS

| 0 325 770 | 8/1989 | European Pat. Off. . |
| 352192 | 1/1990 | European Pat. Off. ............ 241/152.2 |
| 0 513 770 | 11/1992 | European Pat. Off. . |
| 1 578 466 | 8/1969 | France . |
| 2 337 587 | 8/1977 | France . |
| 61-15045 | 1/1986 | Japan . |
| 40-4135654 | 5/1992 | Japan .................................. 241/152.2 |
| 5-31393 | 2/1993 | Japan . |
| 5-111643 | 5/1993 | Japan . |
| 6-296886 | 10/1994 | Japan . |
| 7-108187 | 4/1995 | Japan . |

OTHER PUBLICATIONS

"The Roller Grinding Mill—Current Technical Position and Potential Development" F. Feige, ZKG International, vol. 6, No. 8, Aug. 1, 1993, pp. 451–456.

*Primary Examiner*—Mark Rosenbaum
*Attorney, Agent, or Firm*—Oliff & Berridge, PLC

[57] ABSTRACT

The grinding efficiency can be improved by use of a vertical roller mill, while reducing the energy consumption and improving the product quality. The disclosed cement clinker grinding apparatus comprises a closed circuit for conveying the ground material from the vertical roller mill (21) to the external separator (28) by the bucket elevator (29), for classifying the conveyed material into coarse powder and fine powder, and further for returning the classified coarse powder into the vertical roller mill (21). That is, a part of the ground material conveyed by the bucket elevator (29) is divided by the distributing damper (32) and then directly returned to the vertical roller mill (21). Since the ground material are not conveyed by air flow conveyance (i.e., air sweep), it is possible to prevent an increase of power consumption of the suction fan (31). Further, since a part of the ground material is distributed by the distributing damper and then further ground again by the vertical roller mill, it is possible to obtain an optimum particle size distribution of the cement products, so that the cement quality can be improved.

8 Claims, 5 Drawing Sheets

6,019,299

CEMENT CLINKER GRINDING APPARATUS USING VERTICAL ROLLER MILL AND ITS METHOD

BACKGROUND OF THE INVENTION

1. Field of the Invention

The present invention relates to a cement clinker grinding apparatus using a vertical roller mill and a method of grinding cement clinkers by the same apparatus, by which cement clinkers are ground and produced as cement products by use of a vertical roller mill.

2. Description of the Related Art

FIG. 5 shows a related art cement clinker grinding apparatus using a vertical roller mill.

In FIG. 5, a separator built-in type vertical roller mill 1 is used for grinding cement clinkers. In the vertical roller mill 1, a table 3 rotatable around a vertical axis 2a is disposed in a housing 2. The table 3 is rotated by a motor 4. Further, a plurality of rollers 5 are arranged on the table 3 so as to be pressed against the table. Further, a built-in separator 6 is arranged over the table 3. Feed material 7 supplied from above the built-in separator 6 is ground between the rollers 5 and the table 3. The ground material is blown or air swept in the upward direction by cool air 8 introduced into the housing 2 from under the table 3, and then classified by the built-in separator 6 into some classes according to the particle diameters of the cement products. The coarse powder having large particle diameters are returned again onto the table 3 within the housing 2. Further, some large particles of diameter which cannot be blown up by the cool air 8 is discharged from under the table 3 and, conveyed upward by a bucket elevator 9, and then returned onto the table 3 together with the newly feed material 7. The fine powder for the products separated by the built-in separator 6 is conveyed to a product collector 10 provided with a bag filter, for instance. The product collector 10 can separate the fine powder from air. The cool air 8 introduced into the separator built-in type roller mill 1 is generated by a suction force of a suction fan 11 provided on the outlet side of the product collector 10.

In the related art cement clinker grinding apparatus using the separator built-in type roller mill 1 as described above with reference to FIG. 5, in order to classify the cement products by the built-in separator 6 provided at the upper portion of the housing 2, it is necessary to introduce a large amount of cool air 8 from under the table 3 so that the particulate material ground between the table 3 and the rollers 5 can be blown up for air flow conveyance. Therefore, the pressure loss within the vertical roller mill is relatively large, and further the power consumption of the suction fan 11 is also very large.

In addition, in the products produced by use the vertical roller mill 1, there exists such a tendency that the particle size distribution of the products is narrow, so that the quality of the cement products deteriorates, in comparison with the products produced by a tube mill as disclosed in Japanese Published Unexamined Patent Application No. 5-111643, Further, in the related art separator built-in type vertical roller mill 1, since the ground material are air-swept in the upward direction to the built-in separator 6 arranged on the upper side of the housing 2 for air flow conveyance, the structure of the vertical roller mill 1 is so constructed in such a way that a large amount of cool air 8 can be introduced. Therefore, since the amount of air to be introduced into the vertical roller mill 1 is large and thereby the cooling performance is large, the temperature of the ground material is relatively low. As a result, a problem arises in that there exists a possibility of false cement setting due to the crystallization water of gypsum. Therefore, in order to prevent the false cement setting, an installation for introducing hot air from the outside is additionally required, thus causing another problem in that the installation cost is high.

SUMMARY OF THE INVENTION

With these problems in mind, therefore, it is the object of the present invention to provide a cement clinker grinding apparatus and method of grinding cement clinkers by use of a vertical roller mill, which can decrease the power consumption and increase the product quality.

To achieve the above-mentioned object, the present invention provides a cement clinker grinding apparatus, comprising: a vertical roller mill for grinding cement clinkers; conveying means for conveying the particulate material ground by said vertical roller mill in upward direction; distributing means for dividing the particulate material ground by said vertical roller mill and conveyed by said conveying means, and for returning a part of the divided the ground material to said vertical roller mill; and a separator for classifying remaining ground material divided by said distributing means into coarse powder and fine powder according to particle sizes of the cement products, for producing the fine powder as products and returning the coarse powder into said vertical roller mill.

Further, said separator includes: classifying means having selecting blades rotated around a vertical axis; and a plurality of cyclones arranged around said classifying means so as to communicate with said classifying means at an upper end of said classifying means.

Further, the cement clinker grinding apparatus further comprises circulating means for circulating air to be supplied to said distributing means and said cyclones.

Further, said classifying means is a distributing damper provided with variable-angle dampers for distributing the ground material conveyed by said conveying means and then dropped therewithin.

In the cement clinker grinding apparatus according to he present invention, the separator is provided outside the vertical roller mill, and the ground material clinkers are conveyed from the vertical roller mill to the separator by the upward conveying means. After having conveyed upward, a part of the conveyed the ground material is divided by the distributing means and then returned to the vertical roller mill as they are. The remaining ground material divided by the distributing means are classified by the separator into fine powder and coarse powder according to the particle sizes. Here, a closed circuit is constructed in such a way that the fine powder can be produced as the products, and the coarse powder can be returned to the vertical roller mill. Since the separator is arranged outside of the vertical roller mill, and since the ground material are conveyed by the upward conveying means; in other words, since the ground material are not conveyed by air flow, it is possible to reduce the energy required to convey the ground material. A part of the ground material divided by the distributing means, is returned to the vertical roller mill directly without passing through the separator. In this case, the ground material having particle diameters small enough to be produced through the separator as the fine powder can be returned to the vertical roller mill again and then further ground by the vertical roller mill into further fine powder. As a result, since the final cement products containing more fine powder of smaller particle diameters can be produced from the separator, it is possible to widen the particle size distribution of the cement products. Further, since the amount of the ground material to be directly returned to the vertical roller mill without passing through the separator can be controlled, it is possible to freely adjust the particle size distribution of the cement products, with the result that it is possible to produce the cement products having the optimum quality.

Further, since classifying air of separator is used being circulated within the classifying means and the cyclones, it is unnecessary to introduce a lot of cool air for classification, so that it is possible to maintain the temperature of the ground material at the optimum value of the ground material.

Further, the present invention provides a method of grinding cement clinkers by use of a cement clinker grinding apparatus having a closed circuit composed of: a vertical roller mill having no built-in separator; conveying means for conveying particulate material ground by the vertical roller mill; and a separator for classifying the particulate material ground by the vertical roller mill and conveyed by the conveying means, for producing fine powder products, for returning coarse powder to the vertical roller mill, wherein a part of the particulate material ground by the vertical roller mill and conveyed by the conveying means is directly returned to the vertical roller mill, without passing through the separator.

In the cement clinker grinding method according to the present invention, cement clinkers can be ground effectively by a closed circuit composed of the vertical roller mill, the separator and the conveying means, it is without use of the air flow conveyance. Further, a part of the particulate material ground by the vertical roller mill and then conveyed by the conveying means can be returned directly to the vertical roller mill, without passing through the separator. In this case, the ground material having particle diameters small enough to be produced through the separator as the fine powder can be returned to the vertical roller mill again and then further ground by the vertical roller mill into further fine powder. As a result, since the final cement products containing more fine powder of smaller particle diameters can be produced from the separator, it is possible to widen the particle size distribution of the cement products. Further, since the amount of the ground material to be directly returned to the vertical roller mill without passing through the separator can be controlled, it is possible to freely adjust the particle size distribution of the cement products, with the result that it is possible to produce the cement products having the optimum quality.

DETAILED DESCRIPTION OF THE PREFERRED EMBODIMENTS

Figure 1:
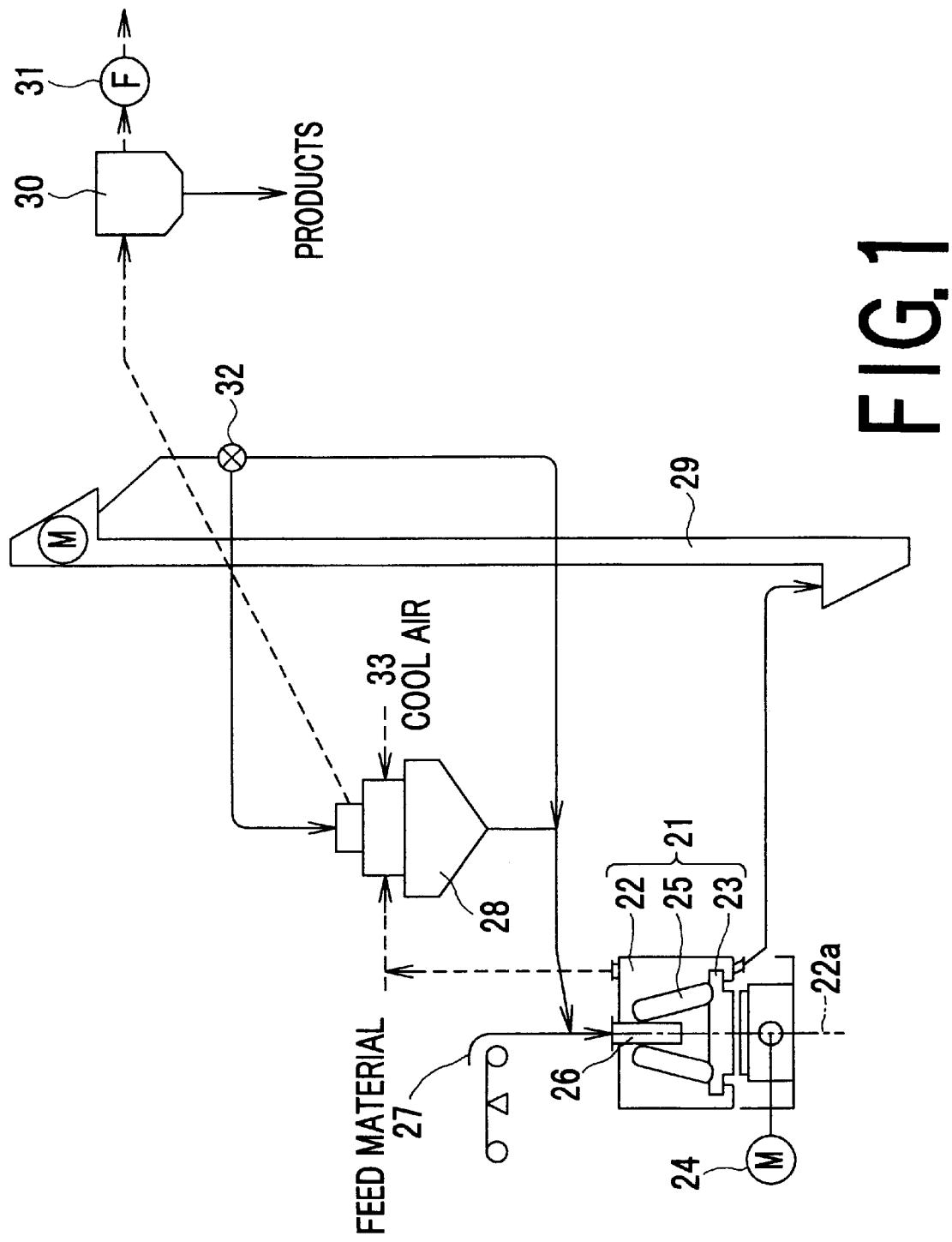
FIG. 1 is a system diagram showing the construction of a first embodiment of the cement clinker grinding apparatus according to the present invention.

FIG. 1 is a diagrammatical view showing a first embodiment of the cement clinker grinding apparatus according to the present invention.

In FIG. 1, a separator is not provided within a housing 22 of a vertical roller mill 21. A table 23 is arranged within the housing 22 so as to be rotated around a vertical axis 22a at the lower portion of the housing 22. The table 22 is rotated by a motor 24, and the surface of the table 23 are pushed by a plurality of rollers 25. Feed material 27 such as cement clinkers is supplied between the table 23 and the rollers 25 through a feed material chute 26. The supplied feed material 27 is crushed by the rollers 25 on the table 23 for pulverization. All the amount of the ground material is discharged substantially from under the table 23, and then conveyed to a separator 28 by use of a bucket elevator (upward conveying means) 29. In this construction, since air flow is not used within the vertical roller mill 21 to convey the ground material, it is unnecessary to introduce a large amount of cool air into the housing 22 for air flow conveyance. Fine powder classified by the separator 28 is collected by a collector 30 provided with a bag filter, for instance. The collecting air is generated by a suction fan 31. In this embodiment, since a large amount of cool air is not introduced into the vertical roller mill 21 for air flow conveyance, it is possible to reduce the power consumption of the suction fan 31.

A part of the particulate material (cement clinkers) ground by the vertical roller mill 21 and then conveyed by the bucket elevator 29 is divided by a distribution damper 32, and then returned directly to the vertical roller mill 21. The distribution damper 32 separates the ground material dropping from the upper end of the bucket elevator 29. The distribution damper 32 is of simple construction having a damper whose angle can be changed.

Figure 2:
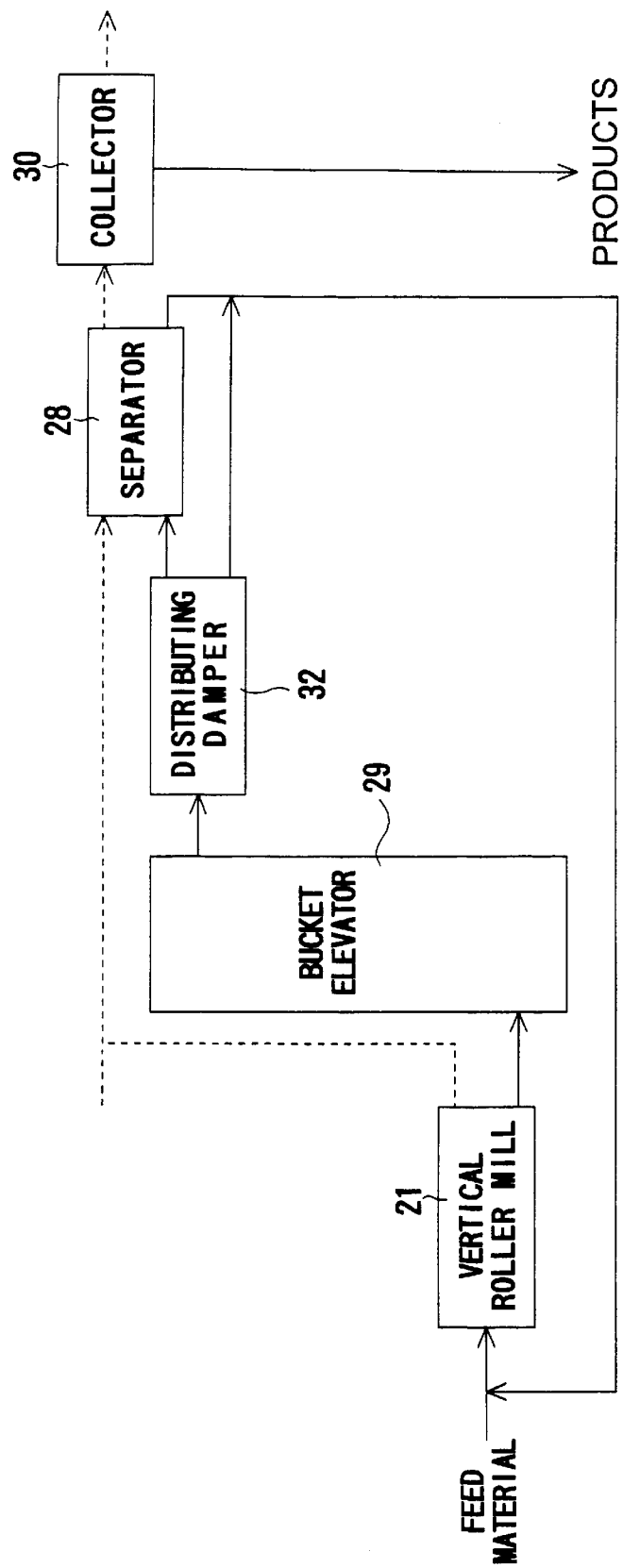
FIG. 2 is a block diagram showing the functional construction of the grinding apparatus shown in FIG. 1.
Figure 5:
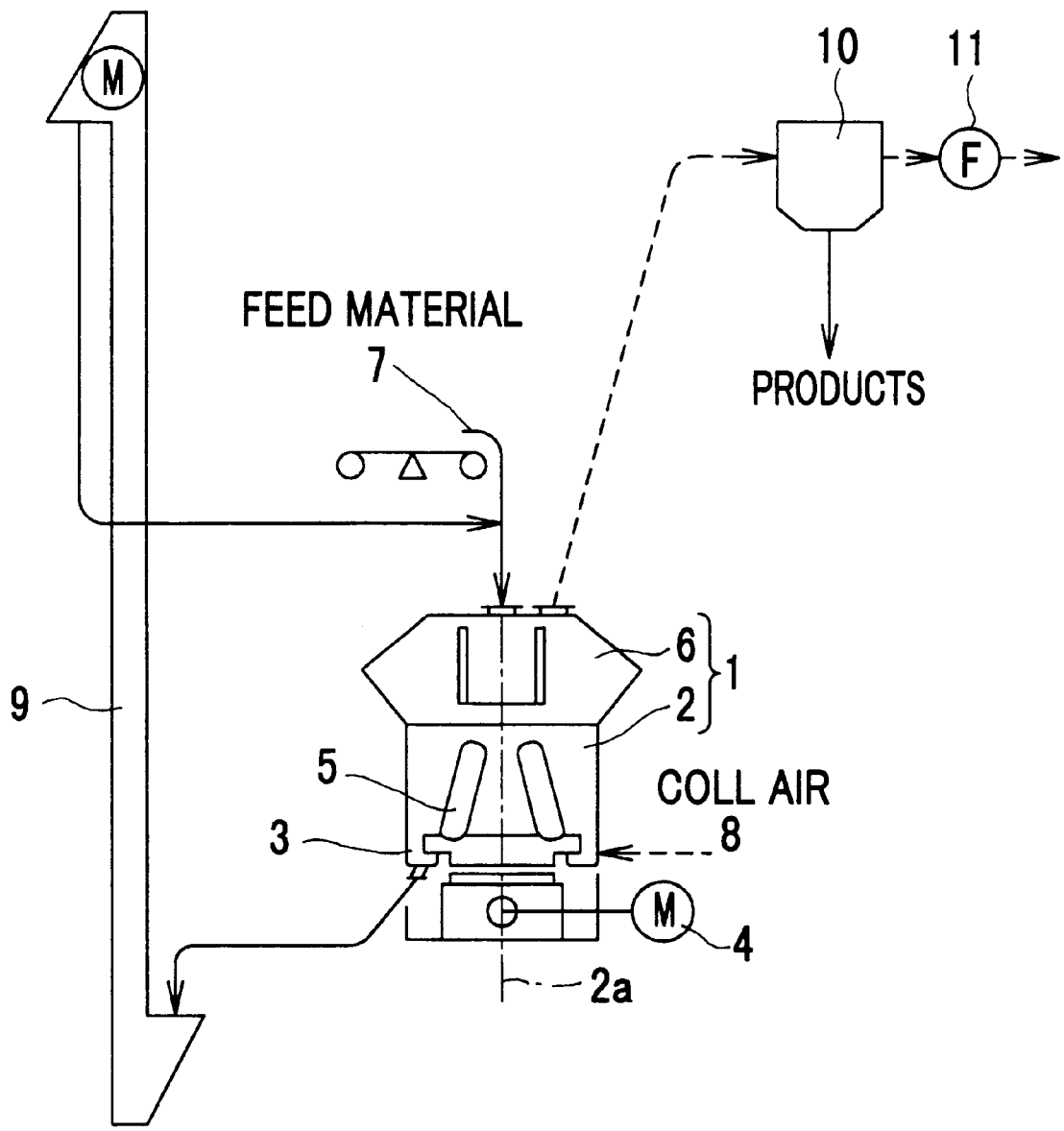
FIG. 5 is a system diagram showing the construction of a related art cement clinker grinding apparatus.

FIG. 2 shows a functional block diagram of the cement clinker grinding apparatus shown in FIG. 1. This embodiment is characterized in that the vertical roller mill 21 having no separator and the external separator 28 constitute a closed circuit for grinding cement clinkers. In the related art separator built-in type vertical roller mill 1 as shown in FIG. 5, since a large amount of air is introduced into the roller mill 1 and further since the ground material are conveyed to the built-in separator by air flow, the pressure loss in the vertical roller mill 1 is very large and further the power consumed by the suction fan 11 is also large. In contrast with this, in the present embodiment, since the ground material of the vertical roller mill 21 are conveyed to the separator 28 by use of the bucket elevator 29, the amount of air to be extracted from the vertical roller mill 21 can be reduced to such an extent as to prevent dust from being produced within the housing 22. Further, the pressure loss caused when the products are separated by the external separator 28 is as low as about 120 mm $H_2O$ which is very smaller than about 700 mm $H_2O$ of the related art separator built-in type vertical roller mill 1. As a result, it is possible to reduce the power consumption of the suction fan 31 remarkably.

Further, in the related art vertical roller mill in general, the obtained products are narrow in the particle size (diameter) distribution, as compared with that of the tube mill. In other words, there exists such a tendency that n value of R-R (Rosen-Ramlar) diagram is large. Further, it is difficult to control the particle size distribution freely. In the case of cement products, since the particle size distribution is important from the standpoint of product quality, there exists a need of widening the particle size distribution of the cement products obtained by the prior art vertical roller mill 1.

In contrast with this, in the present embodiment, a part of the ground material of the vertical roller mill 21 can be divided by the distribution damper 32, and then directly returned to the vertical roller mill 21. In other words, all the amount of the particulate material ground by the vertical roller mill 21 is not conveyed to the separator 28 so as to be classified into fine powder and coarse powder, but a part (e.g. 30%) of the amount to be conveyed to the separator 28 is returned to the vertical roller mill 21 as they is, so that the production amount of the fine powder can be increased to that extent. As a result, it is possible to widen the particle size distribution of the cement products and thereby to improve the cement quality. Further, since the amount of ground material to be directly returned to the vertical roller mill 21 can be adjusted freely by changing the damper angle of the distribution damper 32, it is possible to further widen the particle size distribution of the cement products freely.

In the related art vertical roller mill 1, since the structure is such that all the amount of cool air is introduced into the vertical roller mill 1, the cooling performance is excessively large. Therefore, when the temperature of the cement clinkers is low, gypsum ground at the same time together with cement clinkers remains in the cement products, as it is, as gypsum dihydrate, so that there exists a problem in that the false setting of cement due to gypsum dihydrate occurs. On the other hand, when the temperature of the cement clinkers is high, no problem arises because the crystallization water of gypsum becomes gypsum hemihydrate or anhydrous gypsum in the pulverization process. When hot air is introduced for prevention of this problem or when circulation equipment of the exhaust gas is additionally provided, there exists another problem in that a large investment is required for the installation.

In contrast with this, in the present embodiment, since the separator is arranged independently outside of the vertical roller mill, it is possible to select the cool air introduction type. In the construction as shown in FIG. 1, the ground material fed into the separator 28 can be cooled by cool air 33.

Figure 3:
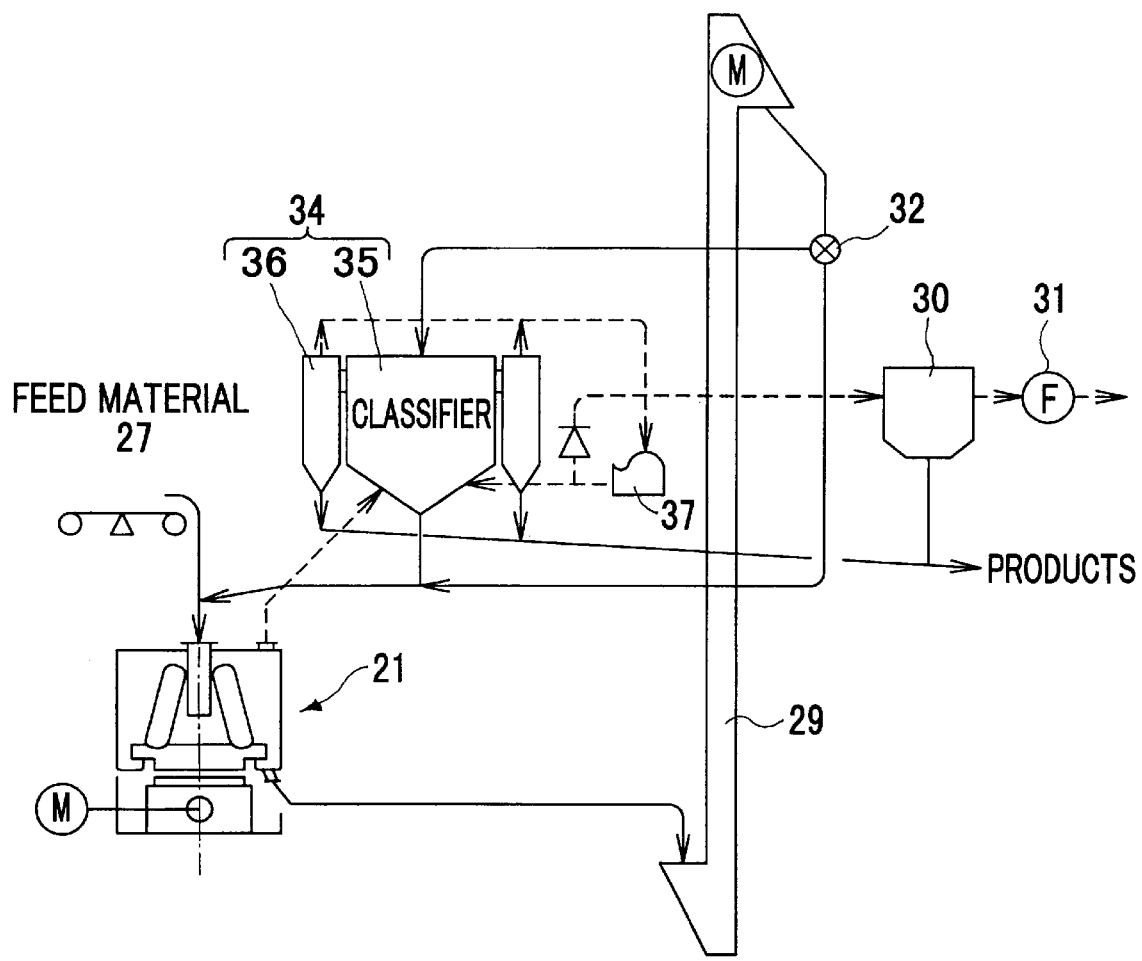
FIG. 3 is a system diagram showing the construction of a second embodiment of the cement clinker grinding apparatus according to the present invention.

FIG. 3 shows a construction of a second embodiment of the cement clinker grinding apparatus according to the present invention, in which the same reference numerals have been retained for the similar elements or parts having the same functions as with the case of the first embodiment shown in FIG. 1, without repeating the similar description thereof.

In a separator 34 of this second embodiment, a plurality of cyclones 36 are arranged around a classifier 35 to collect a part of the products by the cyclones 36. Further, the classifying air is circulated within the separator by use of a fan 37. In this embodiment, since air is used being circulated within the separator 34, it is unnecessary to introduce a large amount of cool air, and thereby the ground material can be kept at a relatively high temperature. When the products are collected by use of the above-mentioned separator 34, the amount of air to be processed by the bag filter of the collector 30 can be reduced down to about 10% of that of the first embodiment of the present invention, with the result that it is possible to reduce the cost of the installation.

Figure 4:
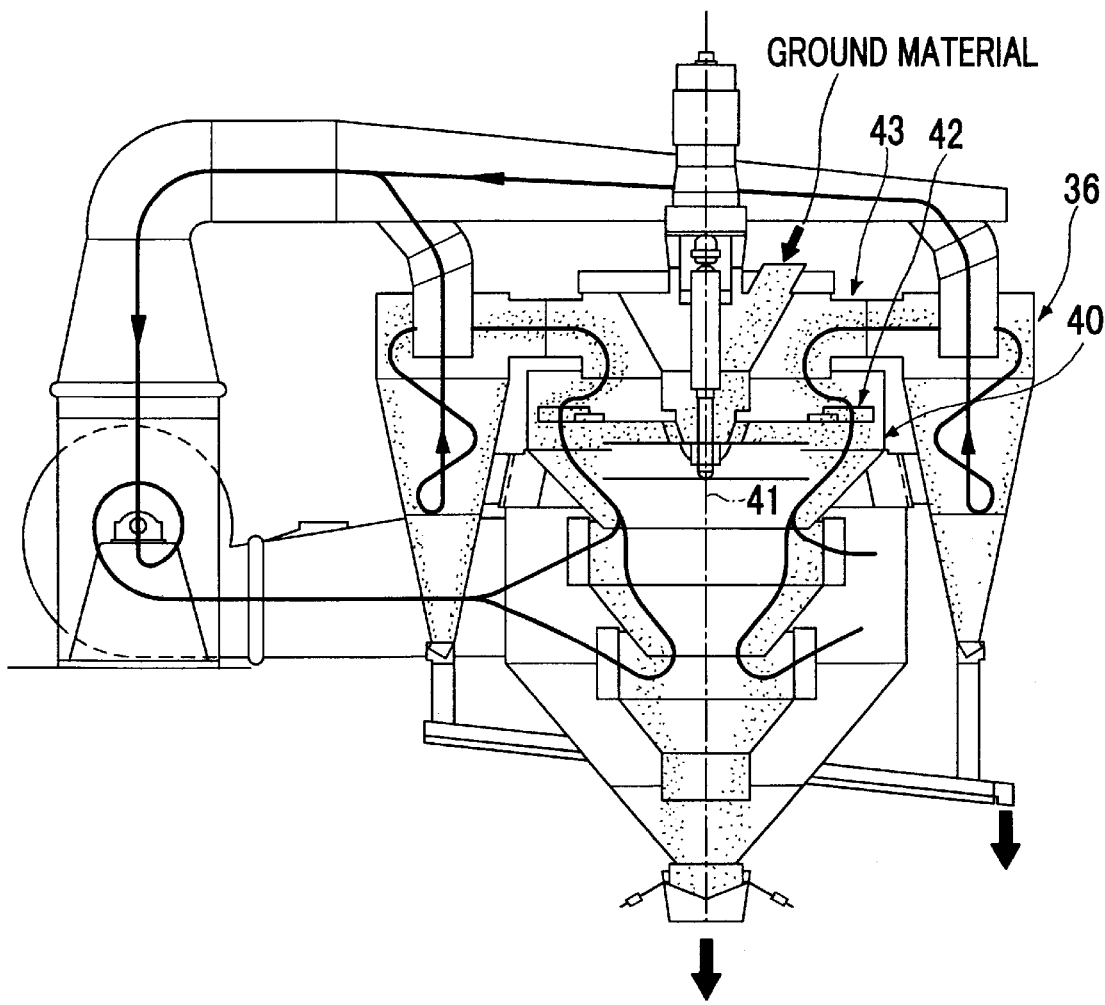
FIG. 4 is a cross-sectional view showing the construction of a separator incorporated in the cement clinker grinding apparatus shown in FIG. 3.

FIG. 4 shows the detailed construction of the separator 34 shown in FIG. 3. In FIG. 4, a casing 40 is formed with a classifying chamber for housing selecting blades 42 rotated around a vertical axis 41. Some exhaust ducts 43 extend from the upper end of the casing in the radially tangential direction thereof, and communicate with external cyclones 36, respectively. Therefore, the coarse powder of the ground material fed into the casing 40 from above is rejected downward by the selecting blades 42. On the other hand, fine powder is introduced into the cyclones 36 through the exhaust ducts 43. Within the cyclones 36, fine powder is separated from air and then collected as the cement products.

As described above, in the cement clinker grinding apparatus using the vertical roller mill according to the present invention, since the separator is arranged outside the vertical roller mill and further since the ground material are conveyed through a closed circuit from the separator to the vertical roller mill, without depending upon air flow conveyance, it is possible to save the energy consumption. Further, since a part of the particulate material ground by the roller mill is directly returned to the vertical roller mill without passing through the separator in such a way that the amount of the ground material to be returned to the vertical roller mill can be controlled, it is possible to freely adjust the amount of the fine powder of the cement products, with the result that the quality of the cement products can be improved.

In addition, since the separator is provided with a plurality of cyclones together with the classifier in such a way that the air can be used being circulated through both the classifier and the cyclones, it is unnecessary to introduce a large amount of cool air, with the result that it is possible to save energy without reducing the temperature of the ground material.

Further, in the cement clinker grinding apparatus using the vertical roller mill according to the present invention, since the closed circuit is constructed by the vertical roller mill having no separator, the external separator, and the conveying means for conveying the grinding material from the vertical roller mill to the external separator, it is possible to return a part of the ground material directly to the vertical roller mill without passing through the separator, so that it is possible to obtain an appropriate distribution of the cement product particle size and thereby to improve the quality of the cement products, while saving energy.

Further, since the types of the separators can be selected freely, when the products must be cooled, it is possible to construct the ground apparatus in such a way that all the amount of cool air is introduced into the separator and that the products are collected by use of the collector (e.g., bag filter), as shown in FIG. 1. On the other hand, when the ground material must be heated, the cyclone collector type separator is used to collect the products by the circulating fan and the cyclones, as shown in FIG. 2. In this case, since a large amount of cool air is not introduced into the separator, it is possible to keep the ground material at a high temperature. In summary, it is possible to adjust the temperature of ground material easily, while reducing the manufacturing cost remarkably.

What is claimed is:

1. A method for grinding cement clinker, comprising the steps of:

grinding cement clinkers into particulate material without separating the ground material by a vertical roller mill;

conveying all particulate material ground by the vertical roller mill in an upward direction by a conveyor;

dividing the particulate material conveyed by the conveyor into a first part and a second part with respect to quantity of the ground material by a divider, a ratio of the quantity of the first part to the second part being variable according to a desired dispersion of size of particle of the cement product;

directly returning the first part to the vertical roller mill without passing through any other step;

grinding the first part into more particulate material by the vertical roller mill without any other intervening steps between the dividing step and the grinding step;

separating only the second part into coarse powder and fine powder according to a desired size of particle of the cement products without any other intervening steps between the dividing step and separating step;

producing the separated fine powder as products;

directly returning the coarse powder to the vertical roller mill without passing through any other step; and grinding the separated coarse powder into more particulate material by the vertical roller mill without any other intervening steps between the separating step and the grinding step.

2. A method for grinding cement clinker of claim 1, wherein dispersion of size of particle of the ground material divided by the divider is the same as dispersion of size of particle of the ground material before dividing by the divider.

3. A cement clinker grinding apparatus, comprising:

a vertical roller mill for grinding cement clinkers without separating material ground thereby;

a conveyer for conveying all material ground by the vertical roller mill in an upward direction;

a divider for dividing the ground material conveyed by the conveyer into a first part and a second part with respect to quantity of the ground material and for directly returning the first part to the vertical roller mill without passing through any other step, a ratio of the quantity of the first part to the second part being variable according to a desired dispersion of size of particle of the cement product;

a separator disposed separately from the vertical roller mill, for directly receiving the second part from the divider without passing through any other step, for separating only the second part into coarse powder and fine powder according to desired size of particle of the cement products for producing the fine powder as products, and for directly returning the coarse powder to the vertical roller mill without passing through any other step; and a suction means for sucking air through the separator so as to separate the second part into the coarse powder and the fine powder.

4. A cement clinker grinding apparatus, comprising:

a vertical roller mill for grinding cement clinkers without separating material ground thereby;

a conveyer for conveying material ground by the vertical roller mill in an upward direction;

a divider for dividing the ground material conveyed by the conveyer into a first part and a second part with respect to quantity of the ground material, a ratio of the quantity of the first part to the second part being variable according to a desired dispersion of size of particle of the cement product;

a transferring route for directly returning the first part to the vertical roller mill without passing through any other step;

a separator disposed separately from the vertical roller mill, for directly receiving the second part from the divider without passing through any other step, for separating only the second part into coarse powder and fine powder according to desired size of particle of the cement products for producing the fine powder as products, and for directly returning the coarse powder to the vertical roller mill without passing through any other step; and a suction means for sucking air through the separator so as to separate the second part into the coarse powder and the fine powder.

5. A cement clinker grinding apparatus of claim 4, wherein dispersion of size of particle of the ground material divided by the divider is the same as dispersion of size of particle of the ground material before dividing by the divider.

6. The cement clinker grinding apparatus of claim 5, wherein the separator includes:

a classifier having selecting blades rotated around a vertical axis; and a plurality of cyclones arranged around the classifier so as to communicate with the classifier at an upper end thereof.

7. The cement clinker grinding apparatus of claim 6, further comprising a circulator for circulating air to be supplied to the classifier and the cyclones.

8. The cement clinker grinding apparatus of claim 5, wherein the divider has a distributing damper being able to swing at variable angles for dividing the ground material conveyed by the conveyer into the first part and the second part.

* * * * *